United States Patent
Tapia et al.

(10) Patent No.: US 10,669,862 B2
(45) Date of Patent: Jun. 2, 2020

(54) AIRFOIL WITH LEADING EDGE CONVECTIVE COOLING SYSTEM

(71) Applicant: HONEYWELL INTERNATIONAL INC., Morris Plains, NJ (US)

(72) Inventors: Luis Tapia, Maricopa, AZ (US); Jason Smoke, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 28 days.

(21) Appl. No.: 16/035,184

(22) Filed: Jul. 13, 2018

(65) Prior Publication Data

US 2020/0018172 A1   Jan. 16, 2020

(51) Int. Cl.
*F01D 5/18* (2006.01)

(52) U.S. Cl.
CPC ........ *F01D 5/187* (2013.01); *F05D 2240/303* (2013.01); *F05D 2260/22141* (2013.01)

(58) Field of Classification Search
CPC ....................... F01D 5/187; F05D 2260/22141
See application file for complete search history.

(56) References Cited

U.S. PATENT DOCUMENTS

| | | | |
|---|---|---|---|
| 4,180,373 A | 12/1979 | Moore et al. | |
| 4,183,716 A | 1/1980 | Takahara et al. | |
| 4,257,737 A | 3/1981 | Andress et al. | |
| 5,100,293 A | 3/1992 | Anzai et al. | |
| 5,356,265 A | 10/1994 | Kercher | |
| 5,931,638 A | 8/1999 | Krause et al. | |
| 6,974,308 B2 | 12/2005 | Halfmann et al. | |
| 7,018,176 B2 | 3/2006 | Mongillo et al. | |
| 7,195,458 B2 | 3/2007 | Liang | |
| 7,281,895 B2 | 10/2007 | Liang | |
| 7,568,887 B1 | 8/2009 | Liang | |
| 7,862,299 B1 | 1/2011 | Liang | |
| 7,914,257 B1 | 3/2011 | Liang | |
| 7,963,745 B1 | 6/2011 | Liang | |
| 8,070,443 B1 | 12/2011 | Liang | |

(Continued)

FOREIGN PATENT DOCUMENTS

| | | |
|---|---|---|
| EP | 1882817 B1 | 2/2017 |
| WO | 2018153796 A1 | 8/2018 |

OTHER PUBLICATIONS

Cohen, J. and Bourell, D.L., "Development of Novel Tapered Pin Fin Geometries for Additive Manufacturing of Compact Heat Exchangers," Proc. of the 27th Annual International Solid Freeform Fabrication Symposium, Nov. 2016, pp. 2314-2336.

(Continued)

*Primary Examiner* — Richard A Edgar
(74) *Attorney, Agent, or Firm* — Lorenz & Kopf, LLP

(57) ABSTRACT

An airfoil includes a leading edge and an opposing trailing edge. The airfoil includes a pressure sidewall and an opposing suction sidewall. A leading edge cavity is defined between the pressure sidewall and the suction sidewall. The leading edge cavity has a first end opposite the leading edge and a second end defined at a rib. The airfoil includes at least one pin structure defined in the leading edge cavity between the first end and the second end. The at least one pin structure includes a main body and a first branch. The main body is coupled to the second end and extends toward the first end. The first branch extends from the main body toward the first end.

18 Claims, 16 Drawing Sheets

(56) References Cited

U.S. PATENT DOCUMENTS

| | | |
|---|---|---|
| 8,215,909 B2 | 7/2012 | Grob |
| 8,292,581 B2 | 10/2012 | Poon et al. |
| 8,770,920 B2 | 7/2014 | Naik et al. |
| 8,864,469 B1 | 10/2014 | Liang |
| 8,920,124 B2 | 12/2014 | Lee |
| 9,267,381 B2 | 2/2016 | Morris et al. |
| 10,316,668 B2 * | 6/2019 | Blake .................. F01D 5/187 |
| 2010/0054952 A1 | 3/2010 | Gross |
| 2010/0284798 A1 | 11/2010 | Campbell et al. |
| 2012/0076660 A1 * | 3/2012 | Spangler ................ F01D 5/187 |
| | | 416/223 R |
| 2014/0130354 A1 | 5/2014 | Pal et al. |
| 2016/0341046 A1 | 11/2016 | Feldmann et al. |
| 2017/0107829 A1 | 4/2017 | Krumanaker et al. |

OTHER PUBLICATIONS

Kamrath, B.D. et al.; Turbine Component with Shaped Cooling Pins; Filed with the USPTO on Mar. 31, 2017 and assigned U.S. Appl. No. 15/475,597.

* cited by examiner

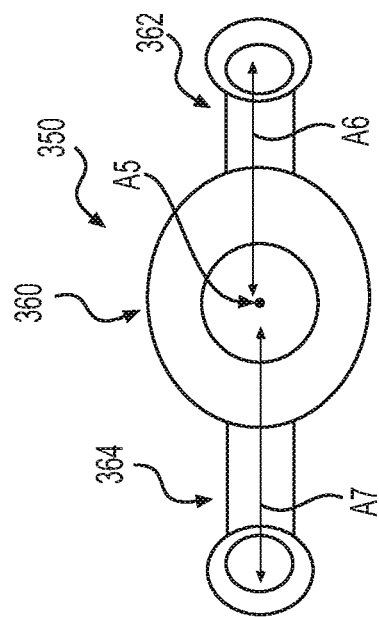
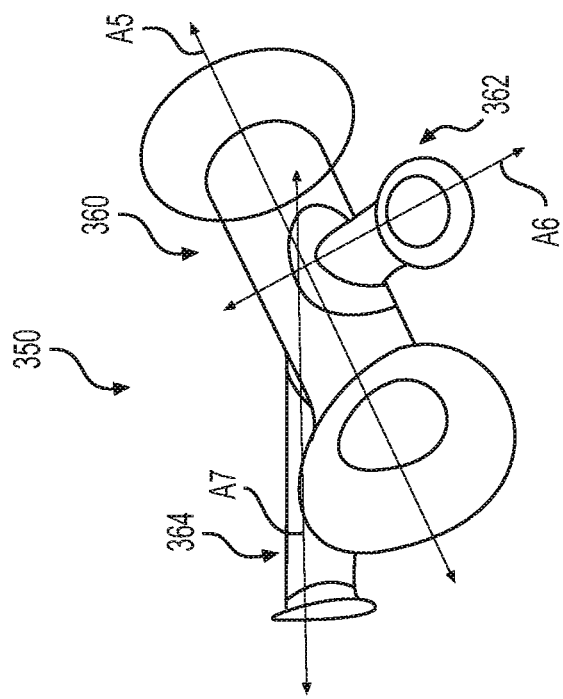
FIG. 10B
FIG. 10A

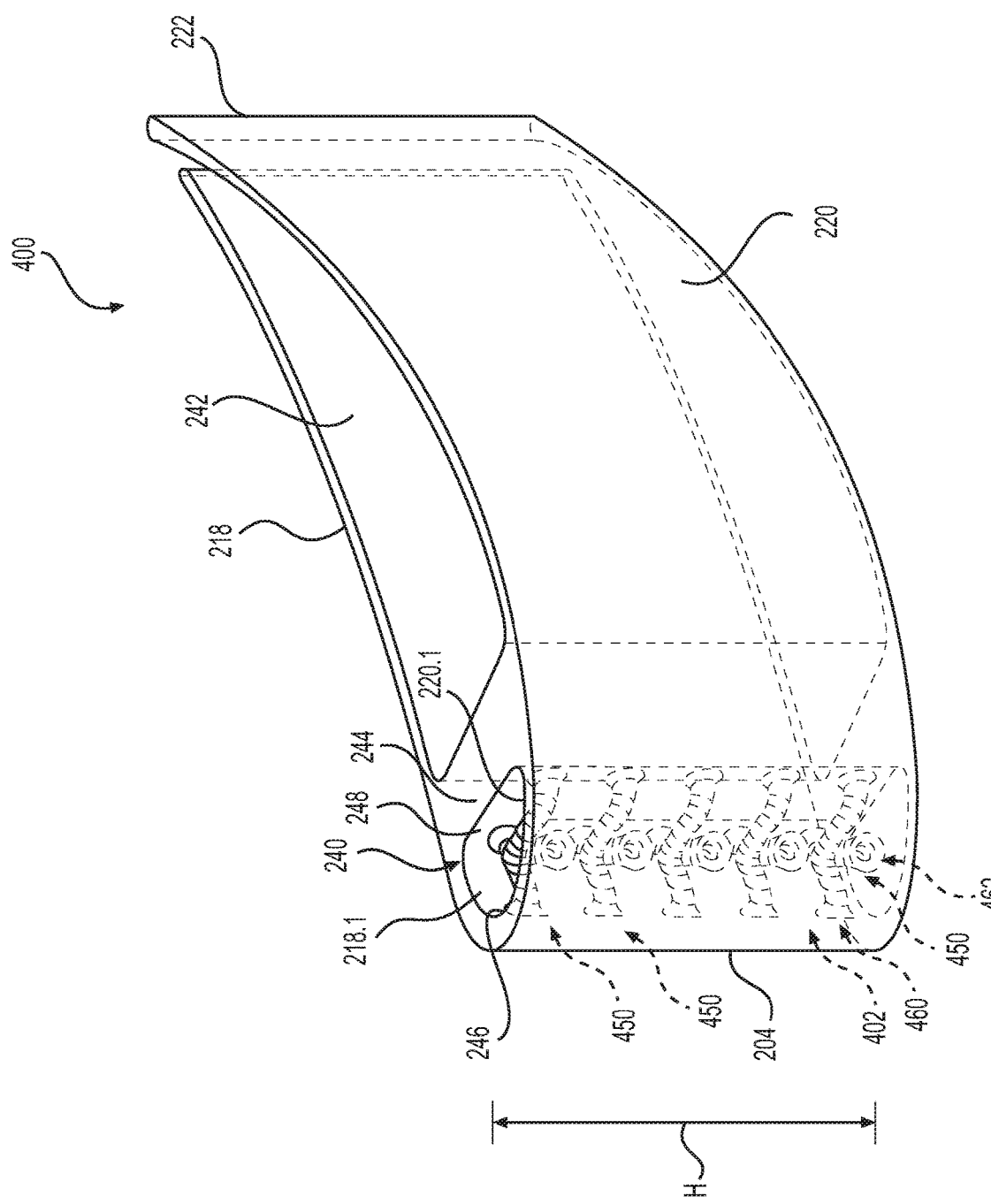

AIRFOIL WITH LEADING EDGE CONVECTIVE COOLING SYSTEM

TECHNICAL FIELD

The present disclosure generally relates to gas turbine engines, and more particularly relates to an airfoil having a leading edge convective cooling system for use with a component, such as an airfoil of a stator or a rotor blade structure, associated with the gas turbine engine.

BACKGROUND

Gas turbine engines may be employed to power various devices. For example, a gas turbine engine may be employed to power a mobile platform, such as an aircraft. Gas turbine engines employ a combustion chamber upstream from one or more turbines, and as high temperature gases from the combustion chamber are directed into these turbines these high temperature gases contact downstream airfoils, such as the airfoils of a stator or a rotor blade structure. Typically, the leading edge of these airfoils experiences the full effect of the high temperature gases, which may increase the risk of oxidation of the leading edge. As higher turbine inlet temperature and higher turbine engine speed are required to improve gas turbine engine efficiency, additional cooling of the leading edge of these airfoils is needed to reduce a risk of oxidation of these airfoils associated with the gas turbine engine.

Accordingly, it is desirable to provide improved cooling for a leading edge of an airfoil, such as an airfoil of a stator or a blade of a gas turbine engine, with a leading edge convective cooling system that allows lower temperature fluid to cool the leading edge of the airfoil via convective heat transfer. Furthermore, other desirable features and characteristics of the present invention will become apparent from the subsequent detailed description and the appended claims, taken in conjunction with the accompanying drawings and the foregoing technical field and background.

SUMMARY

According to various embodiments, an airfoil is provided. The airfoil includes a leading edge and an opposing trailing edge. The airfoil includes a pressure sidewall and an opposing suction sidewall. A leading edge cavity is defined between the pressure sidewall and the suction sidewall. The leading edge cavity has a first end opposite the leading edge and a second end defined at a rib. The airfoil includes at least one pin structure defined in the leading edge cavity between the first end and the second end. The at least one pin structure includes a main body and a first branch. The main body is coupled to the second end and extends toward the first end. The first branch extends from the main body toward the first end.

Further, according to various embodiments, an airfoil is provided. The airfoil includes a leading edge and an opposing a trailing edge. The airfoil includes a pressure sidewall and an opposing suction sidewall. A leading edge cavity is defined between the pressure sidewall and the suction sidewall. The leading edge cavity has a first end opposite the leading edge and a second end defined at a rib. The airfoil includes at least one pin set defined in the leading edge cavity between the first end and the second end. The at least one pin set includes a first pin and a second pin. The first pin is coupled to the second end and extends to an inner surface of the suction sidewall, and the second pin is coupled to the second end and extends toward the first end. The first pin overlaps the second pin.

In addition, according to various embodiments, an airfoil is provided. The airfoil includes a leading edge and an opposing trailing edge. The airfoil includes a pressure sidewall and an opposing suction sidewall. A leading edge cavity is defined between the pressure sidewall and the suction sidewall. The leading edge cavity has a first end opposite the leading edge and a second end defined at a rib. The airfoil includes at least one pin structure defined in the leading edge cavity between the first end and the second end. The at least one pin structure includes a main body, a first branch and a second branch. The main body has a first body end defined from the second end and extending toward the first end. The first branch extends from the second body end to the first end, and the second branch extends from the second body end to an inner surface of the suction sidewall within the leading edge cavity.

DESCRIPTION OF THE DRAWINGS

The exemplary embodiments will hereinafter be described in conjunction with the following drawing figures, wherein like numerals denote like elements, and wherein:

FIG. 10A is a perspective view of a pin of the leading edge convective cooling system of FIG. 8;

FIG. 10B is an end view of the pin of FIG. 10A;

FIG. 11 is a perspective view of another exemplary airfoil with another exemplary leading edge convective cooling system for use with the stator of FIG. 3 and/or the rotor blade structure of FIG. 4 in accordance with various embodiments;

DETAILED DESCRIPTION

Figure 1:
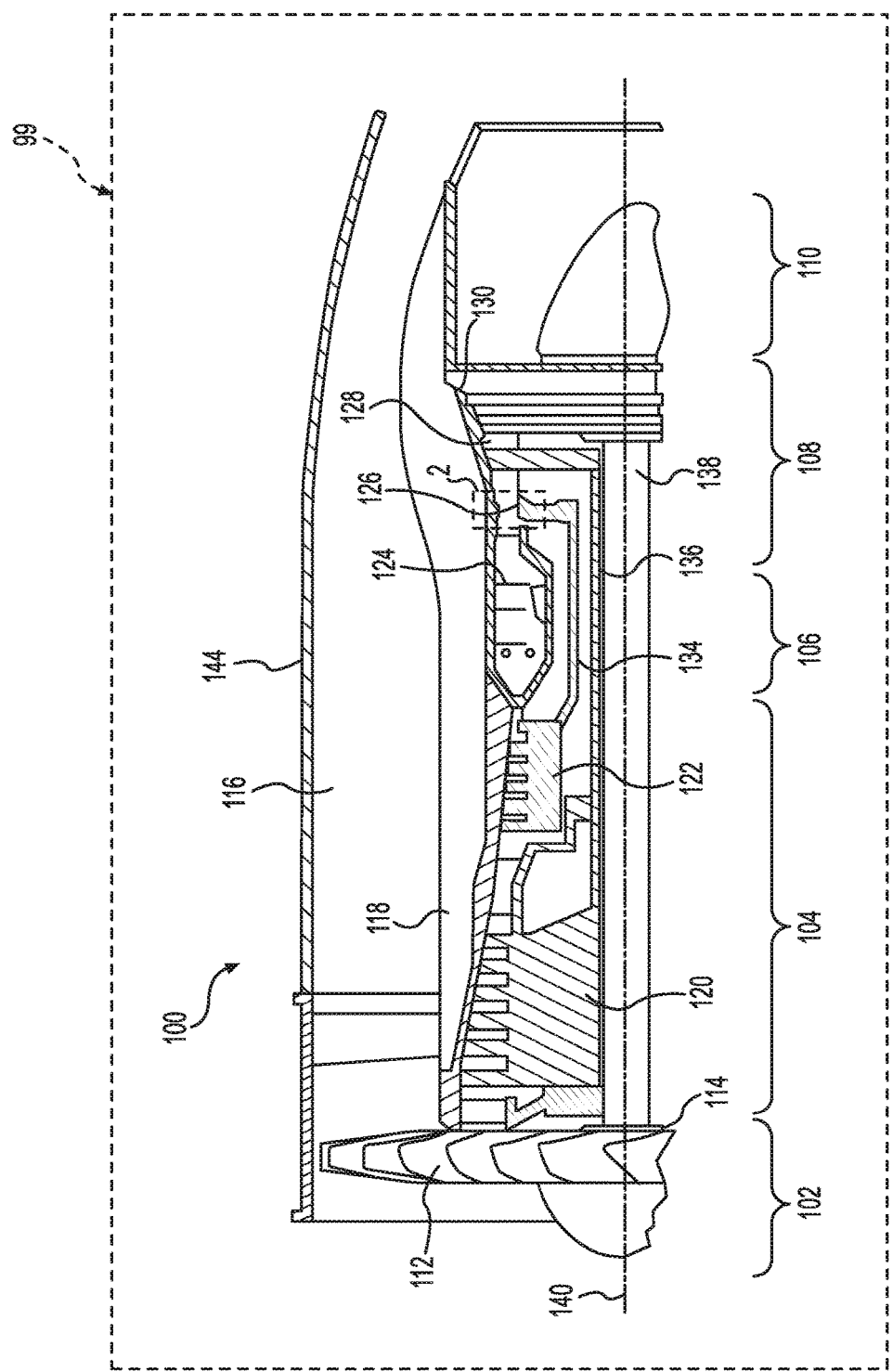
FIG. 1 is a schematic cross-sectional illustration of a gas turbine engine, which includes an exemplary airfoil with a leading edge convective cooling system in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from increased cooling via a convection cooling system, and that the airfoil described herein for use with a gas turbine engine is merely one exemplary embodiment according to the present disclosure. Moreover, while the airfoils with the leading edge convective cooling system are described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel. Also as used herein, the terms "integrally formed" and "integral" mean one-piece and excludes brazing, fasteners, or the like for maintaining portions thereon in a fixed relationship as a single unit.

With reference to FIG. 1, a partial, cross-sectional view of an exemplary gas turbine engine 100 is shown with the remaining portion of the gas turbine engine 100 being axisymmetric about a longitudinal axis 140, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided. As will be discussed herein, with brief reference to FIG. 2, the gas turbine engine 100 includes an airfoil 200 that has a leading edge convective cooling system 202 for providing improved cooling of a leading edge 204 of the airfoil 200. In one example, the airfoil 200 is incorporated into a stator 208 and by providing the airfoil 200 with the leading edge convective cooling system 202, the cooling of the leading edge 204 of the airfoil 200 is increased by convective heat transfer between the leading edge convective cooling system 202 and a low temperature cooling fluid F received from an internal leading edge cooling channel 206 of the stator 208. In another example, the airfoil 200 is incorporated into a rotor blade structure 212, and the cooling of the leading edge 204 of the airfoil 200 is increased by convective heat transfer between the leading edge convective cooling system 202 and the low temperature cooling fluid F received from an internal leading edge cooling channel 210 of the rotor blade structure 212. The leading edge convective cooling system 202 improves cooling of the leading edge 204 of the airfoil 200 associated with the stator 208 and the rotor blade structure 212 by providing improved convective heat transfer between the leading edge 204 and the cooling fluid F, which reduces a risk of oxidation of the airfoil 200.

In this example, with reference back to FIG. 1, the gas turbine engine 100 includes fan section 102, a compressor section 104, a combustor section 106, a turbine section 108, and an exhaust section 110. The fan section 102 includes a fan 112 mounted on a rotor 114 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined by an inner casing 118 and an outer casing 144. In the embodiment of FIG. 1, the compressor section 104 includes an intermediate pressure compressor 120 and a high pressure compressor 122. However, in other embodiments, the number of compressors in the compressor section 104 may vary. In the depicted embodiment, the intermediate pressure compressor 120 and the high pressure compressor 122 sequentially raise the pressure of the air and direct a majority of the high pressure air into the combustor section 106. A fraction of the compressed air bypasses the combustor section 106 and is used to cool, among other components, turbine blades in the turbine section 108.

In the embodiment of FIG. 1, in the combustor section 106, which includes a combustion chamber 124, the high pressure air is mixed with fuel, which is combusted. The high-temperature combustion air is directed into the turbine section 108. In this example, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature air from the combustor section 106 expands through and rotates each turbine 126, 128, and 130. As the turbines 126, 128, and 130 rotate, each drives equipment in the gas turbine engine 100 via concentrically disposed shafts or spools. In one example, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138.

Figure 2:
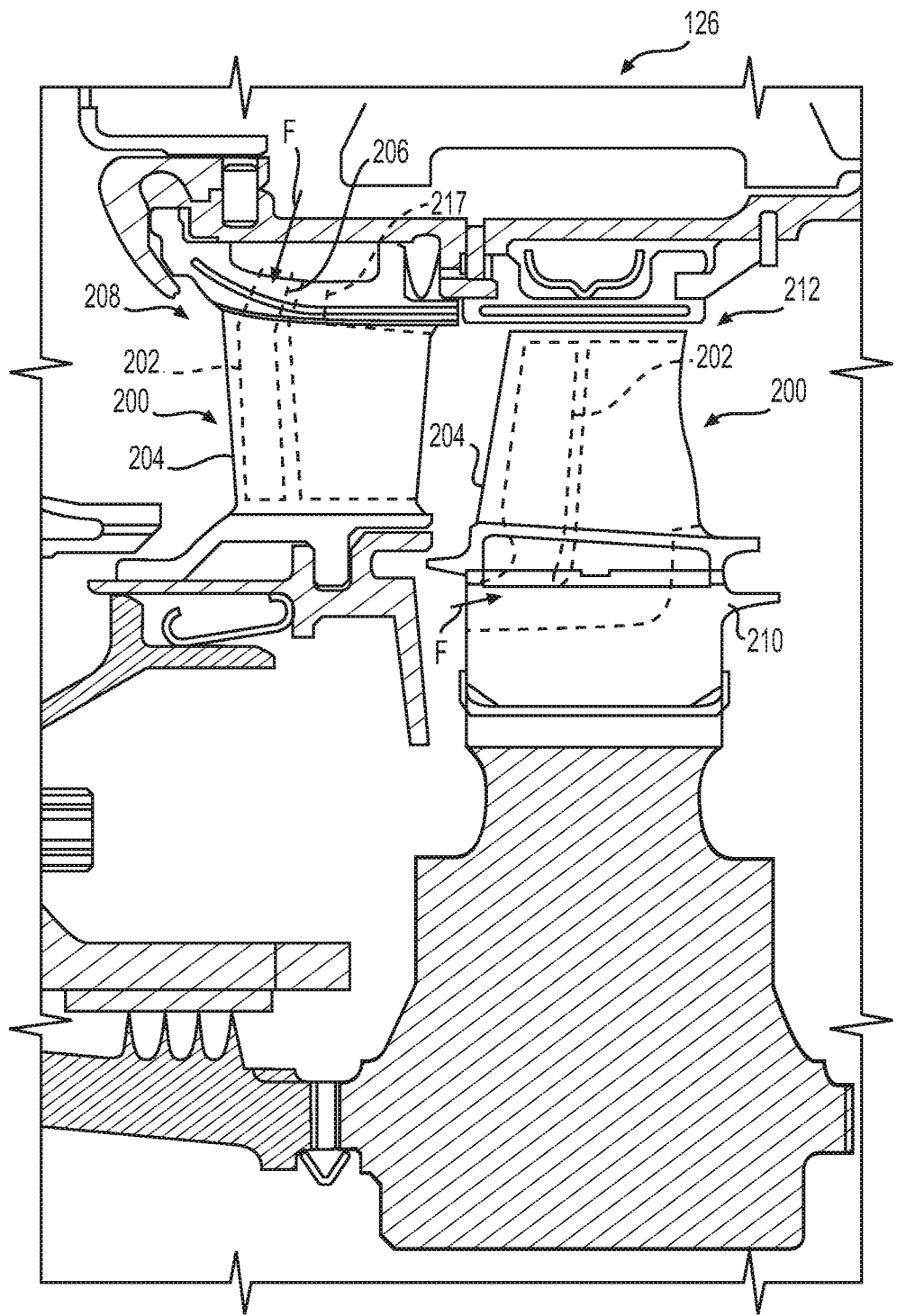
FIG. 2 is a detail cross-sectional view of the gas turbine engine of FIG. 1, taken at 2 of FIG. 1, which illustrates an airfoil of a stator with the leading edge convective cooling system and an airfoil of a rotor blade structure with the leading edge convective cooling system.

With reference to FIG. 2, a portion of the high pressure turbine 126 of the gas turbine engine 100 of FIG. 1 is shown in greater detail. In this example, the leading edge convective cooling system 202 is employed with airfoils 200 associated with both the stator 208 and the rotor blade structure 212. As discussed, the leading edge convective cooling system 202 provides for improved cooling for the respective leading edges 204 of the airfoils 200 by increasing heat transfer between the leading edge 204 and the cooling fluid F.

Figure 3:
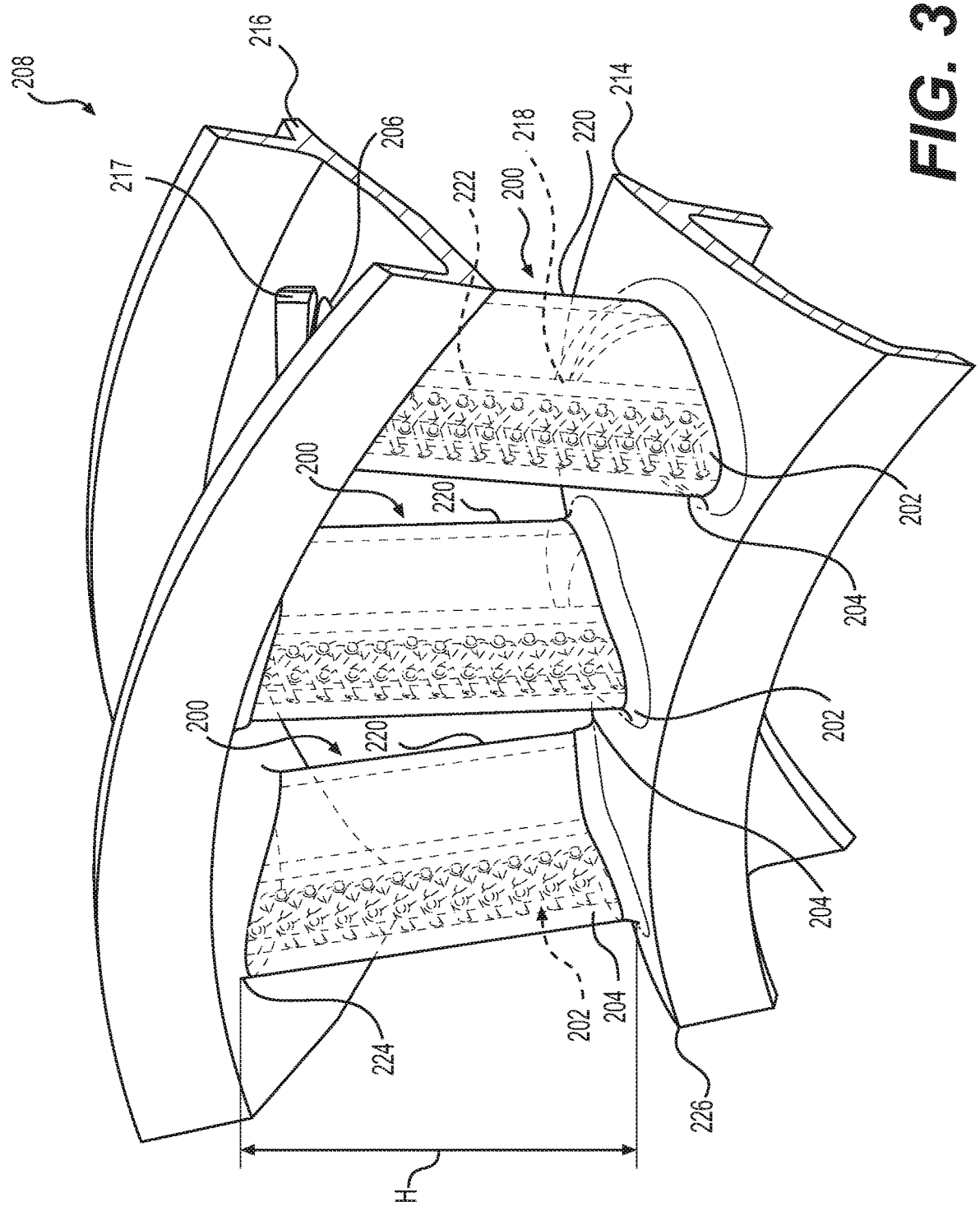
FIG. 3 is a perspective view of a portion of the stator of FIG. 2, which includes the airfoil with the leading edge convective cooling system in accordance with various embodiments.

With reference to FIG. 3, a perspective view of a portion of the stator 208 is shown. In this view, three airfoils 200 associated with the stator 208 are shown, however, it will be understood that the stator 208 generally includes a plurality of airfoils 200, and is axisymmetric with respect to the longitudinal axis 140. Thus, in this example, the airfoil 200 is a vane or a stator. The stator 208 includes a pair of opposing endwalls 214, 216, and the airfoils 200 are arranged in an annular array between the pair of opposing endwalls 214, 216. The endwalls 214, 216 have an annular or circular main or body section. The endwalls 214, 216 are positioned in a concentric relationship with the airfoils 200 disposed in the radially extending annular array between the endwalls 214, 216. The outer endwall 216 circumscribes the inner endwall 214 and is spaced therefrom to define a portion of the combustion gas flow path in the gas turbine engine 100. In this example, the internal leading edge cooling channel 206 is defined through the outer endwall 216. It should be noted that any number of cooling channels may be defined in the outer endwall 216, and in this example, the outer endwall 216 defines the internal leading edge cooling channel 206 and a trailing edge cooling channel 217. The plurality of airfoils 200 is generally disposed in the portion of the combustion gas flow path. Each of the airfoils 200 has a generally concave pressure sidewall 218 and an opposite, generally convex suction sidewall 220. The pressure and suction sidewalls 218, 220 interconnect the leading edge 204 and a trailing edge 222 of each airfoil 200. The airfoil 200 includes a tip 224 and a root 226, which are spaced by a height H of the airfoil 200 or in a spanwise direction. In one example, as will be discussed in further detail below, the leading edge convective cooling system 202 is defined between the pressure and suction sidewalls 218, 220 along the leading edge 204 of each of the plurality of airfoils 200.

Figure 4:
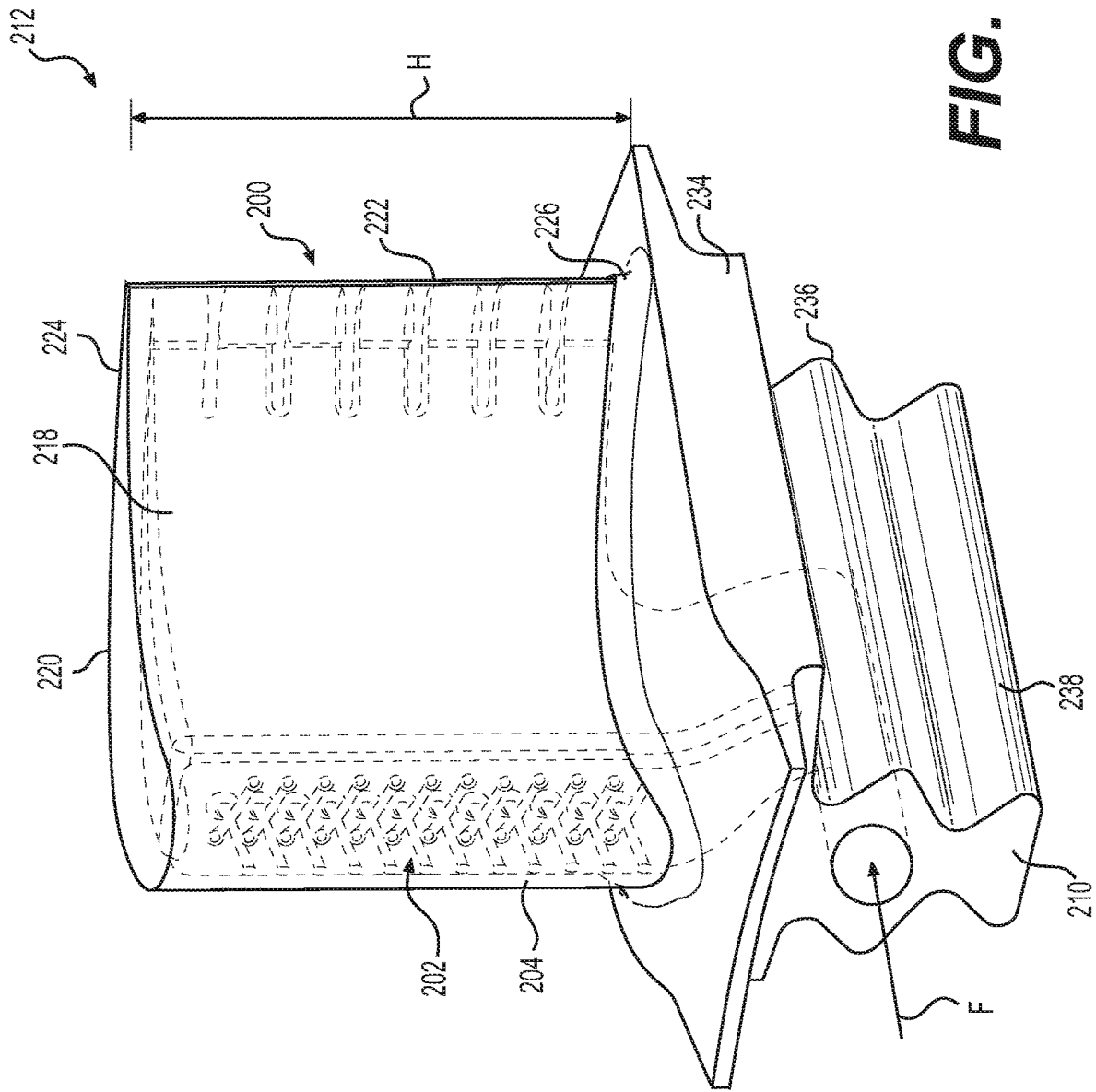
FIG. 4 is a perspective view of the rotor blade structure of FIG. 2, which includes the airfoil with the leading edge convective cooling system in accordance with various embodiments.

With reference to FIG. 4, a perspective view of the rotor blade structure 212 is shown. In this example, the airfoil 200 is a rotor blade. The airfoil 200 includes the tip 224 and the root 226, which are spaced apart for the height H or in a spanwise direction. The airfoil 200 further includes the leading edge 204, the trailing edge 222, the pressure sidewall 218, and the opposite suction sidewall 220. The pressure and suction sidewalls 218, 220 extend from the leading edge 204 to the trailing edge 222. In the illustrated example, the rotor blade structure 212 further includes a platform 234 and a root 236, which is partially shown and joined to the platform 234 opposite the airfoil 200. In certain embodiments, the rotor blade structure 212 may be a discrete, insert-type blade piece, and the root 236 may be imparted with an interlocking shape (e.g. fir-tree or dovetail) for mating insertion into a corresponding slot provided in a separately-fabricated rotor hub. In other embodiments, the rotor blade structure 212 may assume various other forms such that the airfoil 200 is integrally formed with or otherwise joined to a rotor hub as, for example, a bladed disk (blisk). In one example, as will be discussed in further detail below, the leading edge convective cooling system 202 is defined between the pressure and suction sidewalls 218, 220 along the leading edge 204 of the airfoil 200. In this example, the internal leading edge cooling channel 210 is defined through the root 236 at a front or near the leading edge 204 of the airfoil 200, such that the cooling fluid F is received into the airfoil 200 from the root 236 near the leading edge 204 of the airfoil 200 (i.e. forward-fed airfoil). It should be noted, however, that the airfoil 200 of the rotor blade structure 212 may also be a bottom-fed airfoil, such that cooling fluid F is received through a passage defined in a bottom surface (e.g. a surface of the root 236 opposite of a bottom 226 of the airfoil 200). In addition, it should be noted that any number of cooling channels may be defined in the root 236, and in this example, the root 236 defines the internal leading edge cooling channel 210 and a trailing edge cooling channel 238.

Figure 5:
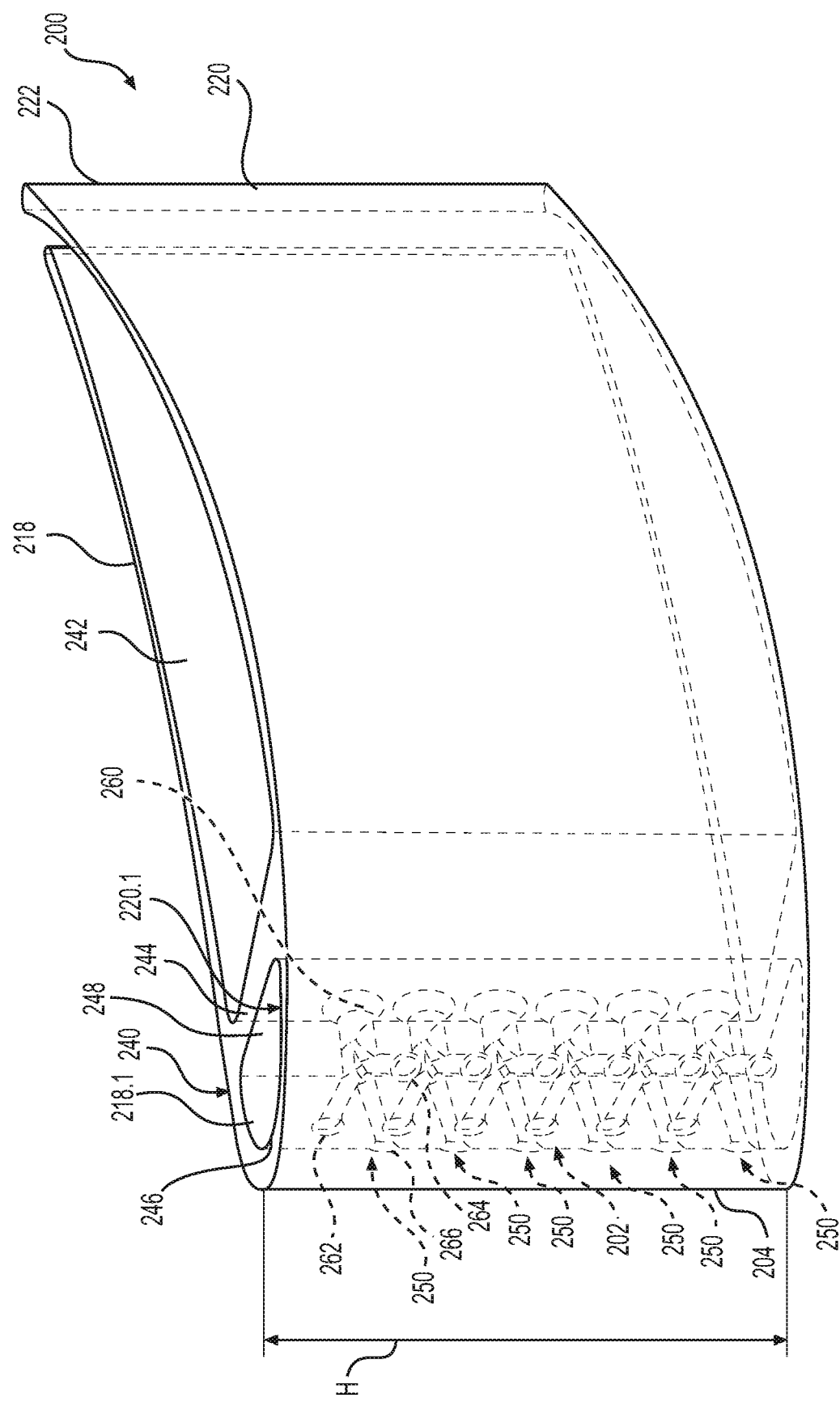
FIG. 5 is a perspective view of the airfoil with the leading edge convective cooling system of FIGS. 3 and 4.

With additional reference to FIG. 5, the airfoil 200, including the leading edge convective cooling system 202, is shown in greater detail. In this example, the airfoil 200 defines, between the pressure and suction sidewalls 218, 220, a first or leading edge cavity 240 and a second or trailing edge cavity 242. It should be understood that the airfoil 200 may define any number of cavities. The leading edge cavity 240 is defined between the pressure and suction sidewalls 218, 220 to be at, next to or adjacent to the leading edge 204, while the trailing edge cavity 242 is defined between the pressure and suction sidewalls 218, 220 so as to be at, next or adjacent to the trailing edge 222. In this example, a rib 244 separates the leading edge cavity 240 from the trailing edge cavity 242. Thus, in this example, the leading edge cavity 240 extends from a first end 246 opposite the leading edge 204 to a second end 248 defined at the rib 244 over the height H of the airfoil 200. The leading edge cavity 240 further extends from an inner surface 218.1 of the pressure sidewall 218 to an inner surface 220.1 of the suction sidewall 220. The leading edge convective cooling system 202 spans the leading edge cavity 240 from the first end 246 to the second end 248 along the height H of the airfoil 200. The leading edge cavity 240 is in fluid communication with the internal leading edge cooling channel 206 of the stator 208 or the internal leading edge cooling channel 210 of the rotor blade structure 212 to receive the cooling fluid F into the airfoil 200.

In one example, the leading edge convective cooling system 202 includes a plurality of pin structures 250 radially disposed within the leading edge cavity 240 (relative to the longitudinal axis 140 of the gas turbine engine of FIG. 1). The plurality of pin structures 250 provide convective cooling between the leading edge 204 and the cooling fluid F received from the internal leading edge cooling channel 210 (FIGS. 3 and 4). In one example, the leading edge convective cooling system 202 includes about six pin structures 250 that are spaced apart over the height H of the airfoil 200, however, it should be understood that the airfoil 200 may include any number of pin structures 250. In this example, each of the pin structures 250 is substantially the same and has a main body 260, a first branch 262, a second branch 264 and a third branch 266. The main body 260, the first branch 262, the second branch 264 and the third branch 266 are each substantially cylindrical. In this example, the main body 260, the first branch 262, the second branch 264 and the third branch 266 are each substantially solid tubes; however, one or more of the main body 260, the first branch 262, the second branch 264 and the third branch 266 may be hollow or include a plurality of internal supports.

Figure 6:
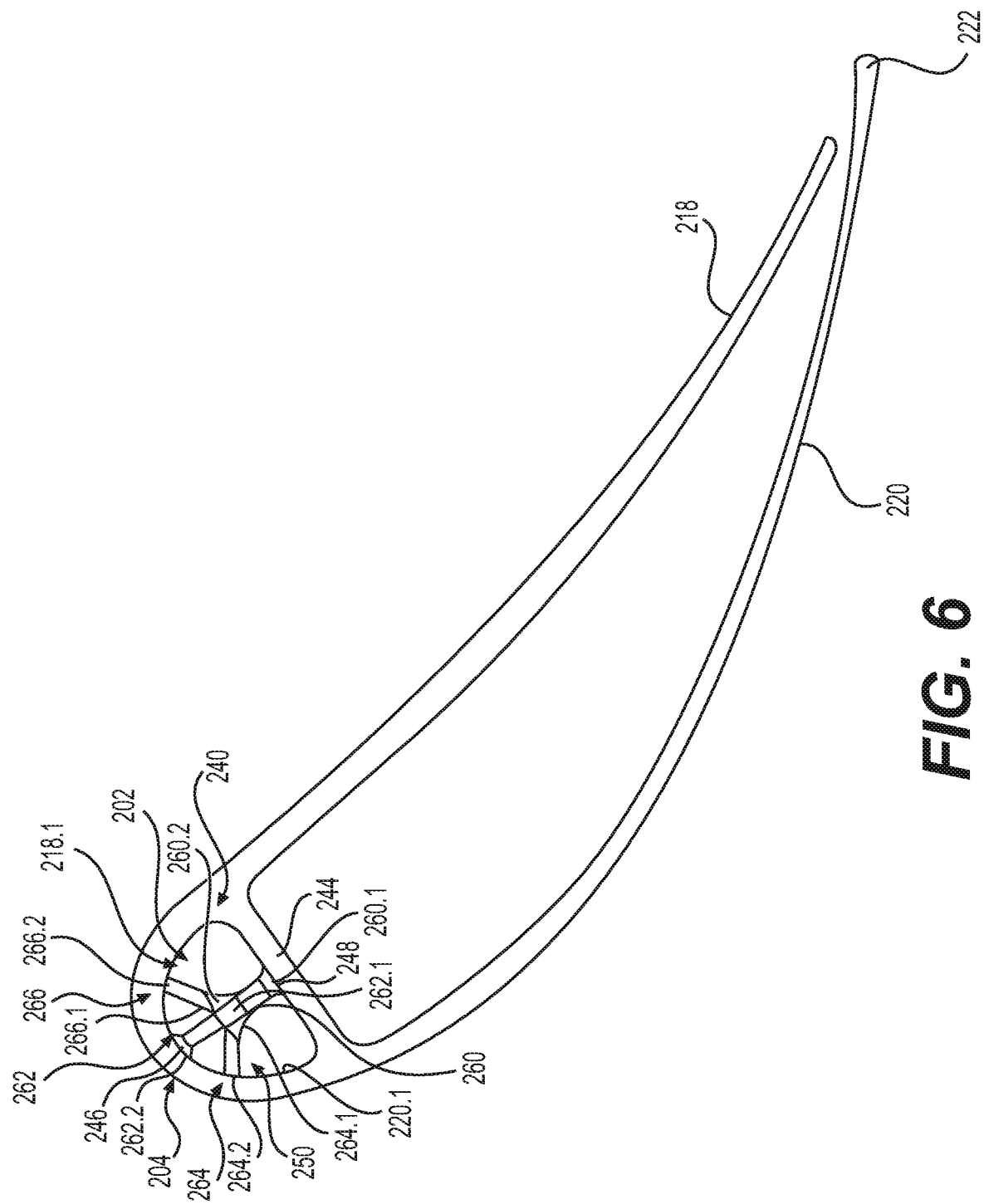
FIG. 6 is a top view of the airfoil with the leading edge convective cooling system of FIG. 5.

With reference to FIG. 6, the main body 260 is coupled to the second end 248 of the leading edge cavity 240 so as to extend outwardly from the rib 244. The main body 260 includes a first body end 260.1 coupled to or integrally formed with the rib 244 at the second end 248, and an opposite second body end 260.2. The first branch 262, the second branch 264 and the third branch 266 are each coupled to, and in this example, integrally formed with, the second body end 260.2 of the main body 260. The first branch 262 has a first branch end 262.1 and an opposite second branch end 262.2. The first branch end 262.1 is coupled to or integrally formed with the second body end 260.2 of the main body 260, and the second branch end 262.2 is coupled to or integrally formed with the first end 246 of the leading edge cavity 240. The second branch 264 has a third branch end 264.1 and an opposite fourth branch end 264.2. The third branch end 264.1 is coupled to or integrally formed with the second body end 260.2 of the main body 260, and the fourth branch end 264.2 is coupled to or integrally formed with the inner surface 220.1 of the suction sidewall 220 within the leading edge cavity 240. The third branch 266 has a fifth branch end 266.1 and an opposite sixth branch end 266.2. The fifth branch end 266.1 is coupled to or integrally formed with the second body end 260.2 of the main body 260, and the sixth branch end 266.2 is coupled to or integrally formed with the inner surface 218.1 of the pressure sidewall 218 within the leading edge cavity 240. It should be noted that the orientation of the pin structures 250 may be reversed, such that the second branch end 262.2 is coupled to the second end 248 and the first body end 260.1 is coupled to the first end 246 of the leading edge cavity 240, if desired.

Figure 7B:
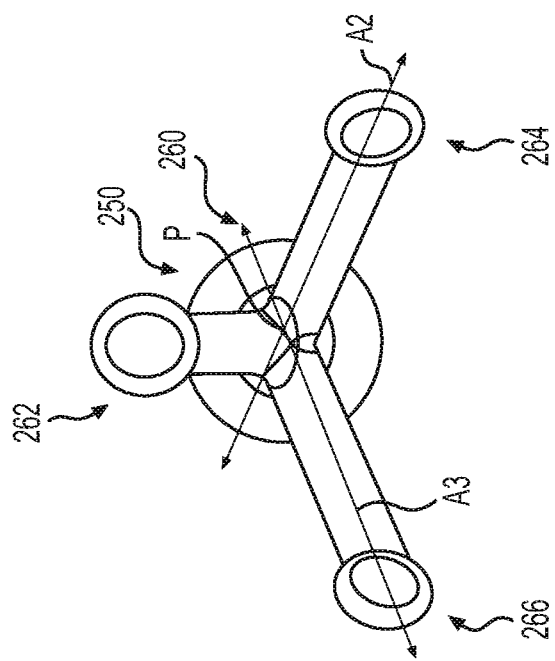
FIG. 7B is an end view of the pin of FIG. 7A.
Figure 7A:
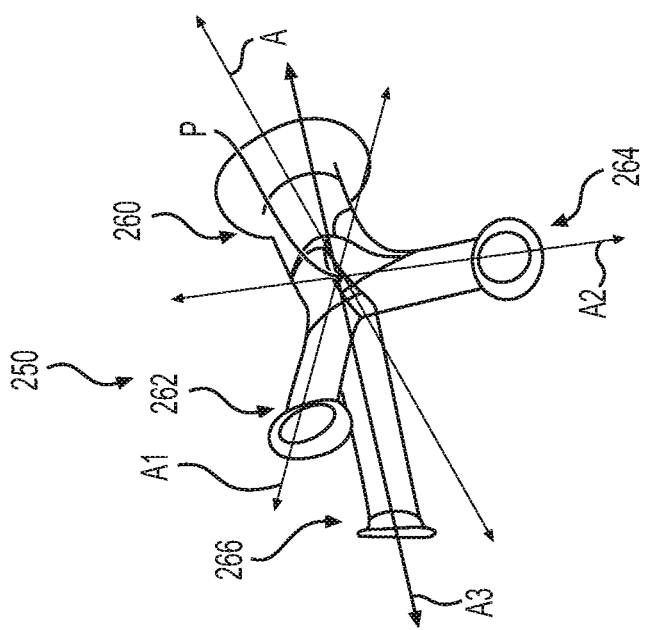
FIG. 7A is a perspective view of a pin of the leading edge convective cooling system of FIG. 5.
Figure 7D:
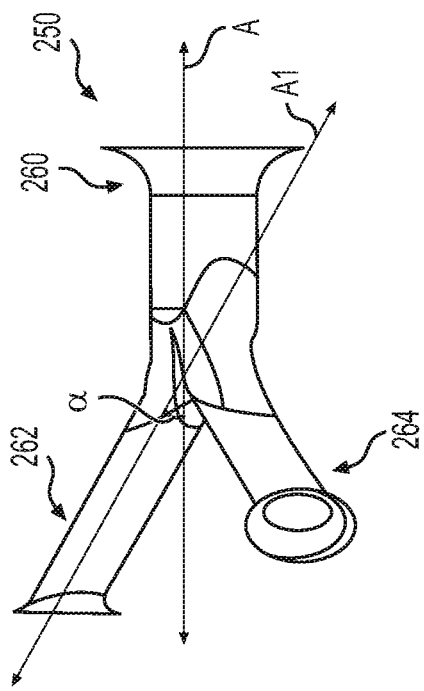
FIG. 7D is a side view of the pin of FIG. 7A.
Figure 7C:
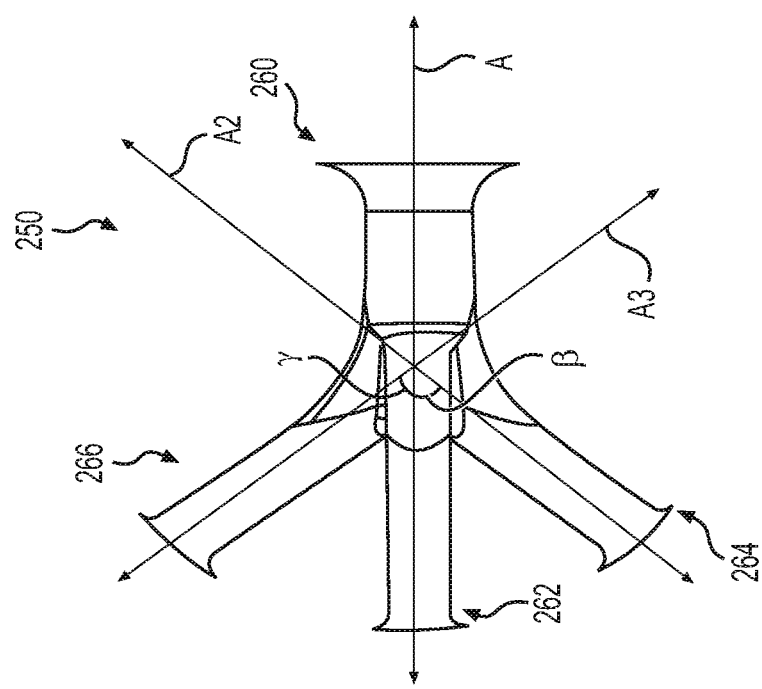
FIG. 7C is a top view of the pin of FIG. 7A.

With reference to FIGS. 7A-7D, a single one of the pin structures 250 is shown, with the understanding that the remaining pin structures 250 are substantially the same. As shown in FIG. 7A, the main body 260 extends along an axis A, the first branch 262 extends along an axis A1, the second branch 264 extends along an axis A2, and the third branch 266 extends along an axis A3. Thus, the first branch 262, the second branch 264 and the third branch 266 extend along separate and discrete axes that intersect the main body 260, and the first branch 262, the second branch 264 and the third branch 266 do not share a common axis. As shown in FIG. 7B, each of the axes A1, A2 and A3 intersect the axis A of the main body 260 at a point P. Thus, each of the axes A1, A2 and A3 are substantially transverse or oblique to the axis A of the main body 260 (FIG. 7A). With reference to FIG. 7C, the axis A2 intersects the axis A at an angle β, which ranges from about 10 degrees to about 90 degrees. The axis A3 intersects the axis A at an angle γ, which ranges from about 10 degrees to about 90 degrees. With reference to FIG. 7D, the axis A1 intersects the axis A at an angle α, which ranges from about 10 degrees to about 60 degrees.

With reference to FIG. 5, in one example, each of the pin structures 250 are integrally formed, monolithic or one-piece, and are composed of a metal or metal alloy. In this example, each of the pin structures 250 are integrally formed, monolithic or one-piece with the airfoil 200, and are composed of the same metal or metal alloy as the airfoil 200. Generally, the airfoil 200 and the pin structures 250 are composed of an oxidation and stress rupture resistant, single crystal, nickel-based superalloy, such as the nickel-based superalloy commercially identified as "CMSX 4" or the nickel-based superalloy identified as "SC180."

In one example, in order to manufacture the airfoil 200 including the pin structures 250, a core that defines the airfoil 200 including the pin structures 250 is cast, molded or printed from a ceramic material. In this example, the core is manufactured from a ceramic using ceramic additive manufacturing or selective laser sintering. With the core formed, the core is positioned within a die. With the core positioned within the die, the die is injected with liquid wax such that liquid wax surrounds the core. A wax sprue or conduit may also be coupled to the cavity within the die to aid in the formation of the airfoil 200. Once the wax has hardened to form a wax pattern, the wax pattern is coated or dipped in ceramic to create a ceramic mold about the wax pattern. After coating the wax pattern with ceramic, the wax pattern may be subject to stuccoing and hardening. The coating, stuccoing and hardening processes may be repeated until the ceramic mold has reached the desired thickness.

With the ceramic mold at the desired thickness, the wax is heated to melt the wax out of the ceramic mold. With the wax melted out of the ceramic mold, voids remain surrounding the core, and the ceramic mold is filled with molten metal or metal alloy. In one example, the molten metal is poured down an opening created by the wax sprue. It should be noted, however, that vacuum drawing may be used to fill the ceramic mold with the molten metal. Once the metal or metal alloy has solidified, the ceramic is removed from the metal or metal alloy, through chemical leaching, for example, leaving the pin structures 250 formed in the airfoil 200, as illustrated in FIG. 5. It should be noted that alternatively, the pin structures 250 may be formed in the airfoil 200 using conventional dies with one or more portions of the core (or portions adjacent to the core) comprising a fugitive core insert. As a further alternative, the airfoil 200 including the pin structures 250 may be formed using other additive manufacturing processes, including, but not limited to, direct metal laser sintering.

It should be noted that the in the example in which the airfoil 200 is part of a rotor blade structure 212, the airfoil 200 may be manufactured such that the platform 234 and/or root 236 (FIG. 4) is integrally formed with the airfoil 200. In the example of the airfoil 200 as part of the stator 208, the airfoil 200 may be formed with one or more features that enable the attachment of the airfoil 200 to the inner endwall 214 and/or outer endwall 216, such as an extension for forming a slip joint (not shown).

It will be understood that the airfoil 200 and the leading edge convective cooling system 202 described with regard to FIGS. 1-7D may be configured differently to provide convective cooling to the leading edge 204. In one example, with reference to FIG. 8, an airfoil 300 with a leading edge convective cooling system 302 is shown. As the airfoil 300 and the leading edge convective cooling system 302 include components that are substantially similar to or the same as the airfoil 200 and the leading edge convective cooling system 202 discussed with regard to FIGS. 1-7D, the same reference numerals will be used to denote the same or similar features. The airfoil 300 may be employed with either the rotor blade structure 212 and/or the stator 208 to provide improved cooling along the leading edge 204 of the airfoil 300.

In this example, the airfoil 300 defines, between the pressure and suction sidewalls 218, 220, the first or leading edge cavity 240 and the second or trailing edge cavity 242.

It should be understood that the airfoil 300 may define any number of cavities. The leading edge cavity 240 is defined between the pressure and suction sidewalls 218, 220 to be at, next to or adjacent to the leading edge 204, while the trailing edge cavity 242 is defined between the pressure and suction sidewalls 218, 220 so as to be at, next or adjacent to the trailing edge 222. The rib 244 separates the leading edge cavity 240 from the trailing edge cavity 242. The leading edge cavity 240 extends from the first end 246 opposite the leading edge 204 to the second end 248 at the rib 244 over the height H of the airfoil 300. The leading edge cavity 240 further extends from an inner surface 218.1 of the pressure sidewall 218 to an inner surface 220.1 of the suction sidewall 220. The leading edge convective cooling system 302 spans the leading edge cavity 240 from the first end 246 to the second end 248 along the height H of the airfoil 300. The leading edge cavity 240 is in fluid communication with the internal leading edge cooling channel 206 of the stator 208 or the internal leading edge cooling channel 210 of the rotor blade structure 212 to receive the cooling fluid F into the airfoil 300.

In one example, the leading edge convective cooling system 302 includes a plurality of pin structures 350 axially disposed within the leading edge cavity 240. The plurality of pin structures 350 provide convective cooling between the leading edge 204 and the cooling fluid F received from the internal leading edge cooling channel 210 (FIGS. 3 and 4). In one example, the leading edge convective cooling system 302 includes about six pin structures 350 that are spaced apart along the height H of the airfoil 300, however, it should be understood that the airfoil 300 may include any number of pin structures 350. In this example, each of the pin structures 350 is substantially the same and has a main body 360, a first branch 362 and a second branch 364. The main body 360, the first branch 362 and the second branch 364 are each substantially cylindrical. In this example, the main body 360, the first branch 362 and the second branch 364 are each substantially solid tubes; however, one or more of the main body 360, the first branch 362 and the second branch 364 may be hollow or include a plurality of internal supports.

Figure 9:
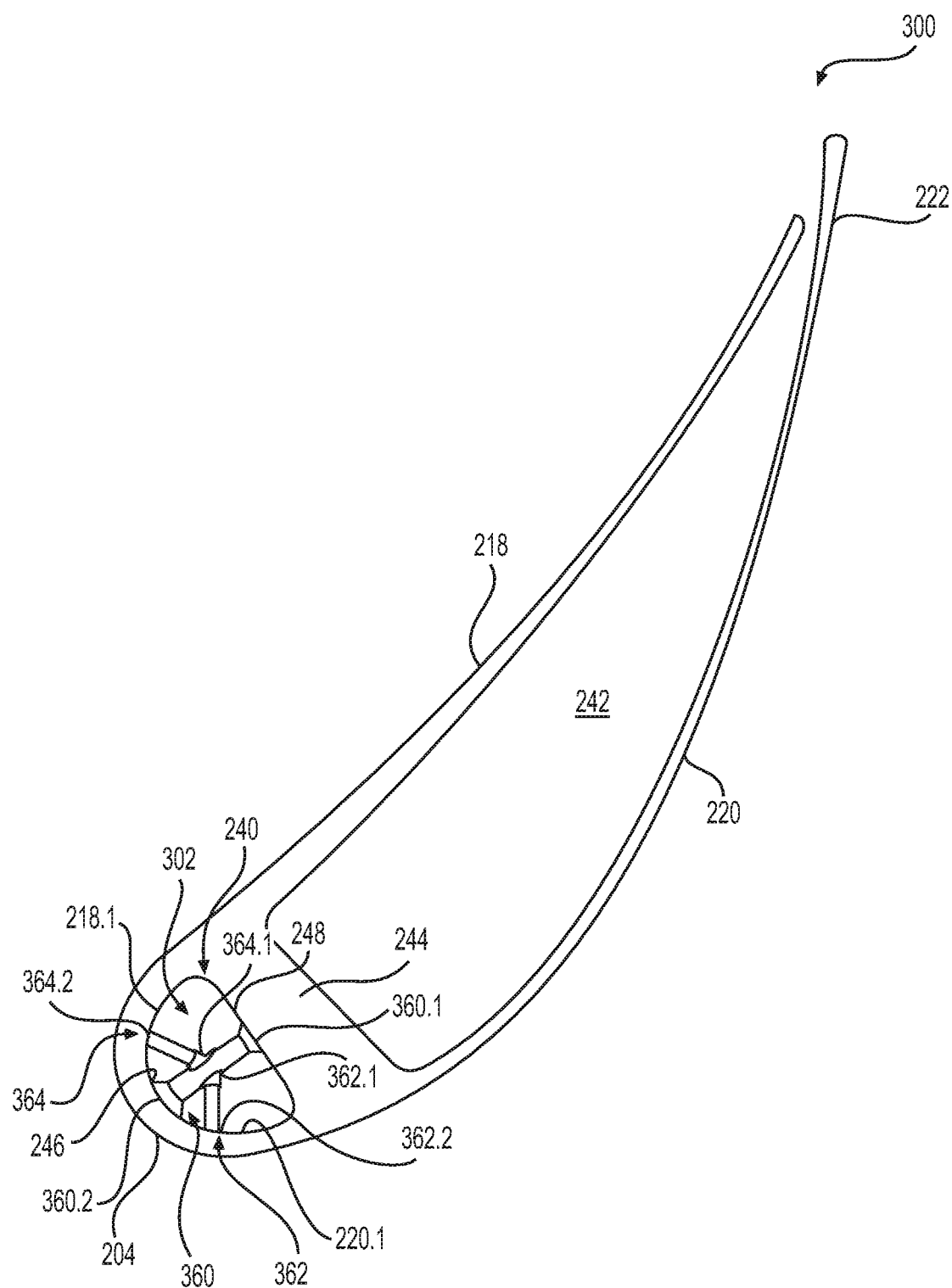
FIG. 9 is a top view of the airfoil with the leading edge convective cooling system of FIG. 8.

With reference to FIG. 9, the main body 360 is coupled to the second end 248 of the leading edge cavity 240 so as to extend outwardly from the rib 244. The main body 360 includes a first body end 360.1 coupled to or integrally formed with the rib 244 at the second end 248, and an opposite second body end 360.2 coupled to or integrally formed with the first end 246. The first branch 362 and the second branch 364 are each coupled to, and in this example, integrally formed with, the main body 360 between the first body end 360.1 and the second body end 360.2. The first branch 362 has a first branch end 362.1 and an opposite second branch end 362.2. The first branch end 362.1 is coupled to or integrally formed with the main body 360 between the first body end 360.1 and the second body end 360.2, and the second branch end 362.2 is coupled to or integrally formed with the inner surface 220.1 of the suction sidewall 220 within the leading edge cavity 240. The second branch 364 has a third branch end 364.1 and an opposite fourth branch end 364.2. The third branch end 364.1 is coupled to or integrally formed with the main body 360 between the first body end 360.1 and the second body end 360.2, and the fourth branch end 364.2 is coupled to or integrally formed with the inner surface 218.1 of the pressure sidewall 218 within the leading edge cavity 240. It should be noted that the orientation of the pin structures 350 may be reversed, such that the second body end 360.2 is coupled to the second end 248 and the first body end 360.1 is coupled to the first end 246 of the leading edge cavity 240, if desired.

Figure 10D:
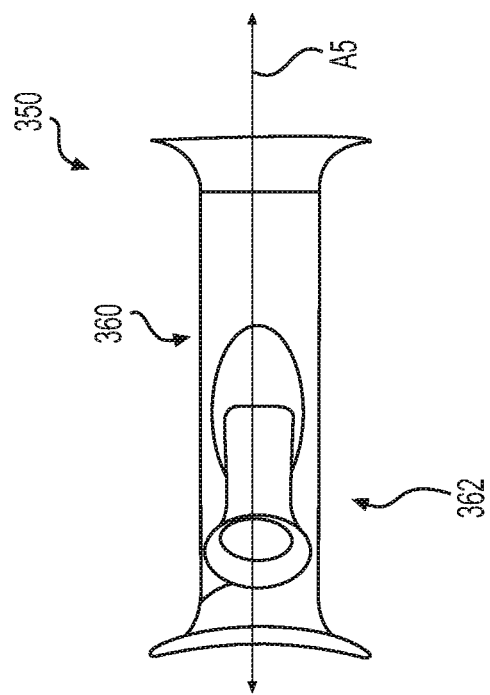
FIG. 10D is a side view of the pin of FIG. 10A.
Figure 10C:
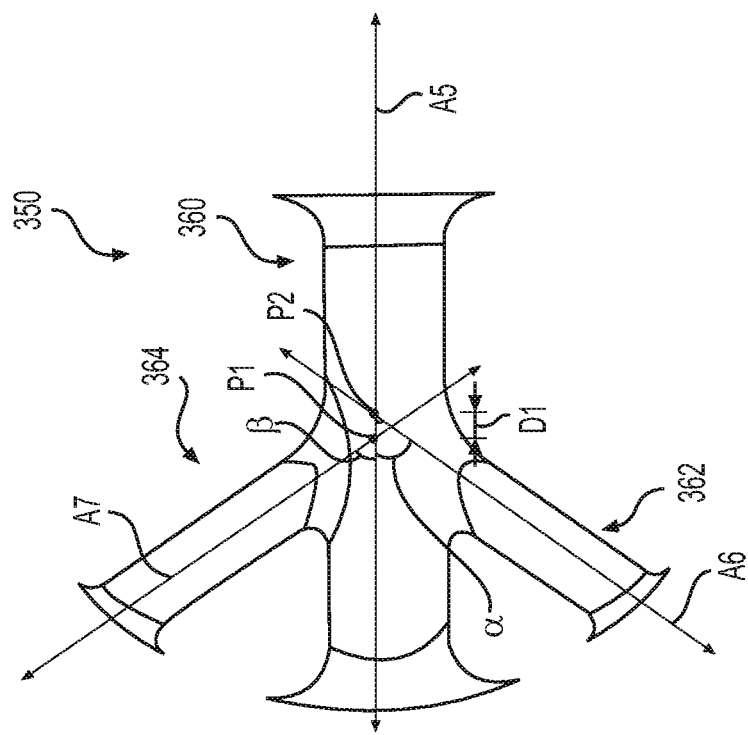
FIG. 10C is a top view of the pin of FIG. 10A.

With reference to FIGS. 10A-10D, a single one of the pin structures 350 is shown, with the understanding that the remaining pin structures 350 are substantially the same. As shown in FIG. 10A, the main body 360 extends along an axis A5, the first branch 362 extends along an axis A6 and the second branch 364 extends along an axis A7. Thus, with additional reference to FIG. 10B, the first branch 362 and the second branch 364 extend along separate and discrete axes that intersect the main body 360, and the first branch 362 and the second branch 364 do not share a common axis. As shown in FIG. 10C, the axis A6 intersects the axis A5 of the main body 360 at a point P1, and the axis A7 intersects the axis A5 of the main body 360 at a point P2, which is spaced apart from the point P1 by a distance D1. Each of the axes A6 and A7 are substantially transverse or oblique to the axis A5 of the main body 360. The axis A6 intersects the axis A5 at an angle $\alpha$, which ranges from about 10 degrees to about 90 degrees. The axis A7 intersects the axis A5 at an angle $\beta$, which ranges from about 10 degrees to about 90 degrees. As shown in FIG. 10D, generally, due to the curved first end 246 of the leading edge cavity 240, the first branch 362 extends for a length, which is less than a length of the main body 360. Similarly, the second branch 364 extends for a length, which is less than a length of the main body 360 (FIG. 10C).

Figure 8:
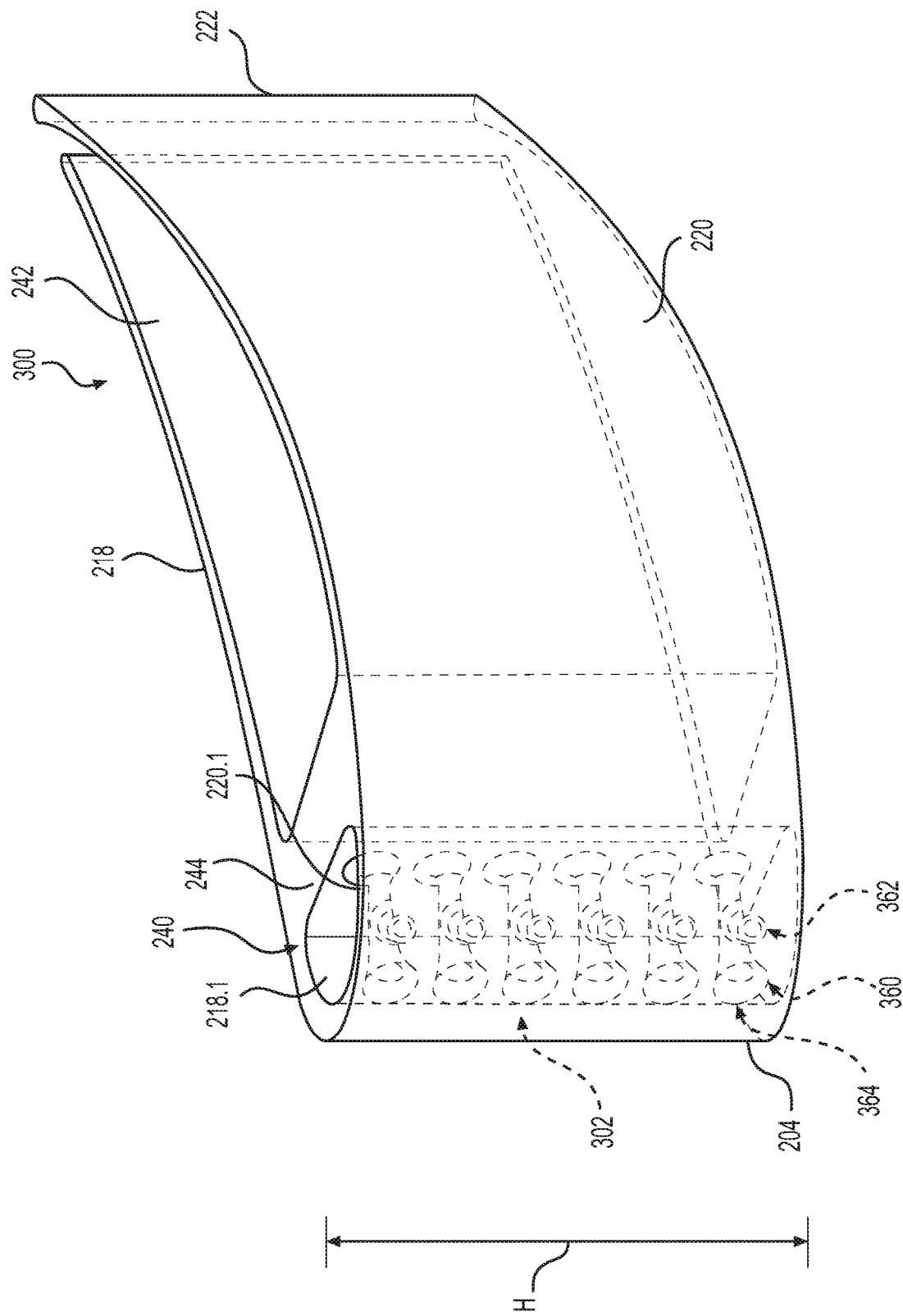
FIG. 8 is a perspective view of another exemplary airfoil with another exemplary leading edge convective cooling system for use with the stator of FIG. 3 and/or the rotor blade structure of FIG. 4 in accordance with various embodiments.

With reference to FIG. 8, in one example, each of the pin structures 350 are integrally formed, monolithic or one-piece, and are composed of a metal or metal alloy. In this example, each of the pin structures 350 are integrally formed, monolithic or one-piece with the airfoil 300, and are composed of the same metal or metal alloy as the airfoil 300. Generally, the airfoil 300 and the pin structures 350 are composed of an oxidation and stress rupture resistant, single crystal, nickel-based superalloy, such as the nickel-based superalloy commercially identified as "CMSX 4" or the nickel-based superalloy identified as "SC180."

As the airfoil 300 and the leading edge convective cooling system 302 may be manufactured in the same manner as the airfoil 200 and the leading edge convective cooling system 202 discussed with regard to FIGS. 1-7D, the manufacture of the airfoil 300 and the leading edge convective cooling system 302 will not be discussed in detail herein. Briefly, however, a core that defines the airfoil 300 including the pin structures 350 is printed from a ceramic material, using ceramic additive manufacturing for example, and investment casting is performed to form the airfoil 300 including the integrally formed leading edge convective cooling system 302. Alternatively, the pin structures 350 may be formed in the airfoil 300 using conventional dies with one or more portions of the core (or portions adjacent to the core) comprising a fugitive core insert. As a further alternative, the airfoil 300 including the pin structures 350 may be formed using other additive manufacturing processes, including, but not limited to, direct metal laser sintering. It should be noted that the in the example in which the airfoil 300 is part of a rotor blade structure 212, the airfoil 300 may be manufactured such that the platform 234 and/or root 236 (FIG. 4) is integrally formed with the airfoil 300. In the example of the airfoil 300 as part of the stator 208, the airfoil 300 may be formed with one or more features that enable the attachment of the airfoil 300 to the inner endwall 214 and/or outer endwall 216, such as an extension for forming a slip joint (not shown).

It will be understood that the airfoil 200 and the leading edge convective cooling system 202 described with regard to FIGS. 1-7D may be configured differently to provide convective cooling to the leading edge 204. In one example, with reference to FIG. 11, an airfoil 400 with a leading edge convective cooling system 402 is shown. As the airfoil 400 and the leading edge convective cooling system 402 include components that are substantially similar to or the same as the airfoil 200 and the leading edge convective cooling system 202 discussed with regard to FIGS. 1-7D, the same reference numerals will be used to denote the same or similar features. The airfoil 400 may be employed with either the rotor blade structure 212 and/or the stator 208 to provide improved cooling along the leading edge 204 of the airfoil 400.

In this example, the airfoil 400 defines, between the pressure and suction sidewalls 218, 220, the first or leading edge cavity 240 and the second or trailing edge cavity 242. It should be understood that the airfoil 400 may define any number of cavities. The leading edge cavity 240 is defined between the pressure and suction sidewalls 218, 220 to be at, next to or adjacent to the leading edge 204, while the trailing edge cavity 242 is defined between the pressure and suction sidewalls 218, 220 so as to be at, next or adjacent to the trailing edge 222. The rib 244 separates the leading edge cavity 240 from the trailing edge cavity 242. The leading edge cavity 240 extends from the first end 246 opposite the leading edge 204 to the second end 248 at the rib 244 over the height H of the airfoil 400. The leading edge cavity 240 further extends from an inner surface 218.1 of the pressure sidewall 218 to an inner surface 220.1 of the suction sidewall 220. The leading edge convective cooling system 402 spans the leading edge cavity 240 from the first end 246 to the second end 248 along the height H of the airfoil 400. The leading edge cavity 240 is in fluid communication with the internal leading edge cooling channel 206 of the stator 208 or the internal leading edge cooling channel 210 of the rotor blade structure 212 to receive the cooling fluid F into the airfoil 400.

In one example, the leading edge convective cooling system 402 includes a plurality of pin sets 450 axially disposed within the leading edge cavity 240. The plurality of pin sets 450 each provide convective cooling between the leading edge 204 and the cooling fluid F received from the internal leading edge cooling channel 210 (FIGS. 3 and 4). In one example, the leading edge convective cooling system 402 includes about five pin sets 450 that are spaced apart along the height H of the airfoil 400, however, it should be understood that the airfoil 400 may include any number of pin sets 450. In this example, each of the pin sets 450 is substantially the same and has a first pin 460 and a second pin 462. The first pin 460 and the second pin 462 are each substantially cylindrical. In this example, the first pin 460 and the second pin 462 are each substantially solid tubes; however, one or more of the first pin 460 and the second pin 462 may be hollow or include a plurality of internal supports.

Figure 12:
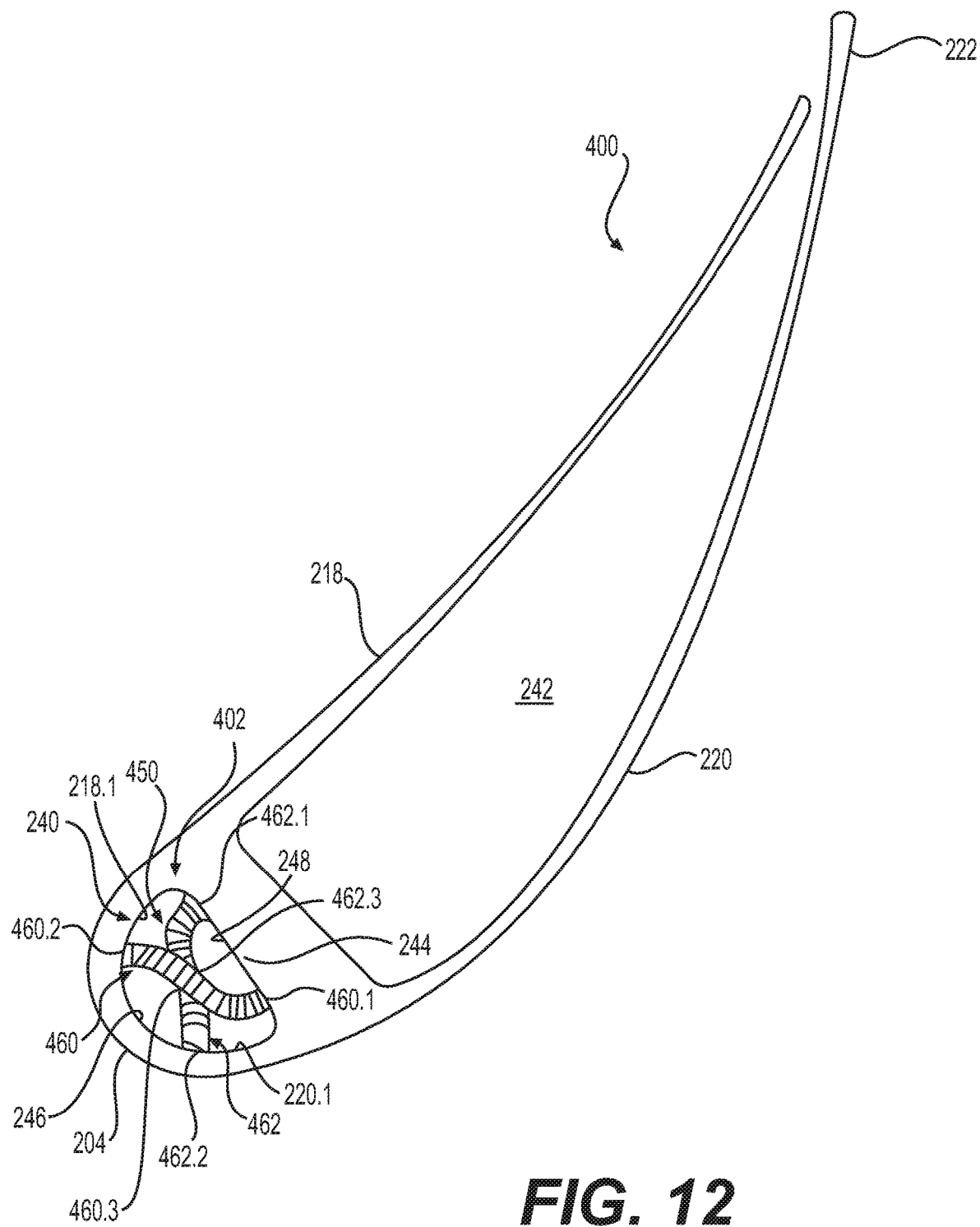
FIG. 12 is a top view of the airfoil with the leading edge convective cooling system of FIG. 11.

With reference to FIG. 12, each of the first pin 460 and the second pin 462 is coupled to the second end 248 of the leading edge cavity 240 so as to extend outwardly from the rib 244 and each of the first pin 460 and the second pin 462 is coupled to the first end 246 so as to extend axially across the leading edge cavity 240. The first pin 460 includes a first pin end 460.1 coupled to or integrally formed with the rib 244 at the second end 248, and an opposite second pin end 460.2 coupled to or integrally formed with the inner surface 218.1 of the pressure sidewall 218 within the leading edge cavity 240. The first pin 460 includes a first curved portion 460.3 defined between the first pin end 460.1 and the second pin end 460.2. In this example, with reference to FIG. 13A, the first curved portion 460.3 curves upward in a Y-direction to enable the first pin 460 to overlap or intertwine with the second pin 462. With reference back to FIG. 12, the second pin 462 includes a third pin end 462.1 coupled to or integrally formed with the rib 244 at the second end 248, and an opposite fourth pin end 462.2 coupled to or integrally formed with the inner surface 220.1 of the suction sidewall 220 within the leading edge cavity 240. The second pin 462 includes a second curved portion 462.3 defined between the first pin end 462.1 and the second pin end 462.2. In this example, with reference to FIG. 13A, the second curved portion 462.3 curves downward in the Y-direction to enable the first pin 460 to overlap or intertwine with the second pin 462.

Figure 13B:
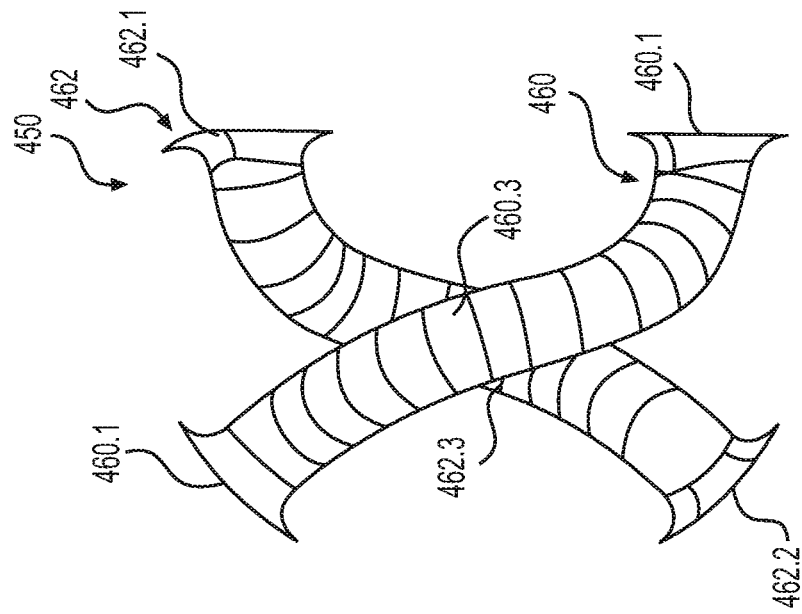
FIG. 13B is a top view of the pin of FIG. 13A.
Figure 13A:
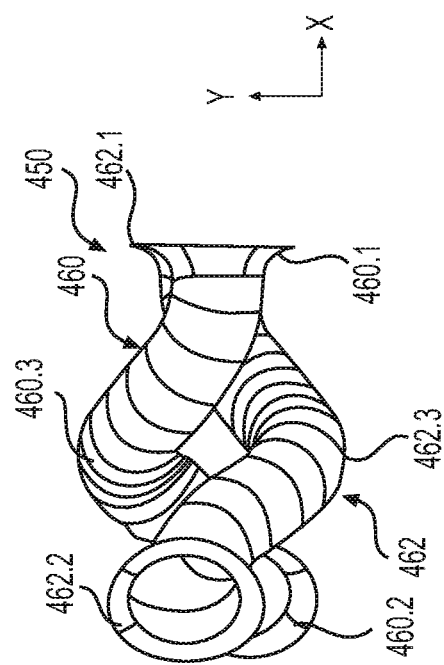
FIG. 13A is a side view of a pin set of the leading edge convective cooling system of FIG. 11.
Figure 13D:
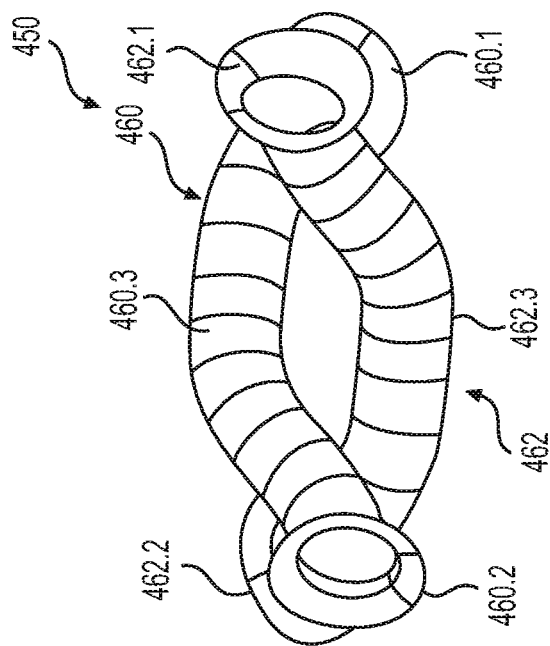
FIG. 13D is an end view of the pin of FIG. 13A.
Figure 13C:
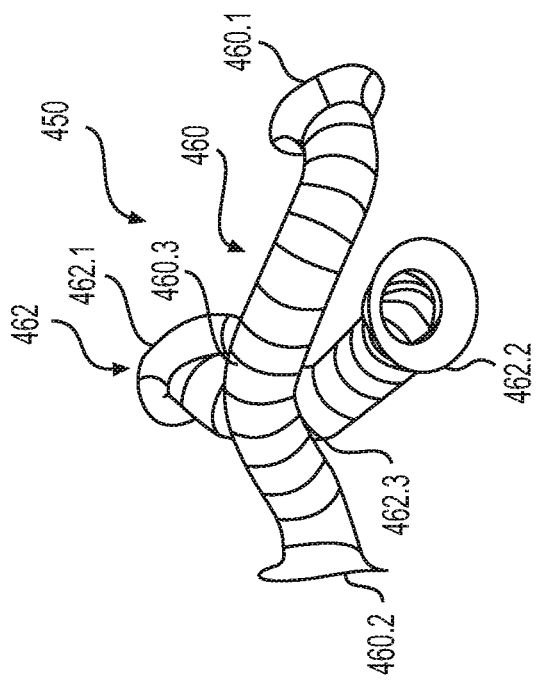
FIG. 13C is a perspective view of the pin of FIG. 13A.

In FIGS. 13A-13D, a single one of the pin sets 450 is shown, with the understanding that the remaining pin sets 450 are substantially the same. As shown in FIG. 13A, the first pin end 460.1 of the first pin 460.1 is coupled to the rib 244 so as to be offset from the third pin end 462.1 of the second pin 462 in the Y-direction. The second pin end 460.2 of the first pin 460 is coupled to the inner surface 218.1 of the pressure sidewall 218 so as to be offset from the fourth pin end 462.2 of the second pin 462. The first curved portion 460.3 overlaps the second curved portion 462.3 (FIGS. 13B and 13C) such that the first pin 460 overlaps or is substantially intertwined with the second pin 462 (FIGS. 13A, 13C and 13D).

With reference to FIG. 11, in one example, each of the pin sets 450 are integrally formed, monolithic or one-piece, and are composed of a metal or metal alloy. In this example, each of the pin sets 450 are integrally formed, monolithic or one-piece with the airfoil 400, and are composed of the same metal or metal alloy as the airfoil 400. Generally, the airfoil 400 and the pin sets 450 are composed of an oxidation and stress rupture resistant, single crystal, nickel-based superalloy, such as the nickel-based superalloy commercially identified as "CMSX 4" or the nickel-based superalloy identified as "SC180."

As the airfoil 400 and the leading edge convective cooling system 402 may be manufactured in the same manner as the airfoil 200 and the leading edge convective cooling system 202 discussed with regard to FIGS. 1-7D, the manufacture of the airfoil 400 and the leading edge convective cooling system 402 will not be discussed in detail herein. Briefly, however, a core that defines the airfoil 400 including the pin sets is printed from a ceramic material, using ceramic additive manufacturing for example, and investment casting is performed to form the airfoil 400 including the integrally formed leading edge convective cooling system 402. Alternatively, the pin sets 450 may be formed in the airfoil 400 using conventional dies with one or more portions of the core (or portions adjacent to the core) comprising a fugitive core insert. As a further alternative, the airfoil 400 including the pin sets 450 may be formed using other additive manufacturing processes, including, but not limited to, direct metal laser sintering. It should be noted that the in the example in which the airfoil 400 is part of a rotor blade structure 212, the airfoil 400 may be manufactured such that the platform 234 and/or root 236 (FIG. 4) is integrally formed with the airfoil 400. In the example of the airfoil 400 as part of the stator 208, the airfoil 400 may be formed with one or more features that enable the attachment of the airfoil 400 to the inner endwall 214 and/or outer endwall 216, such as an extension for forming a slip joint (not shown).

Thus, the leading edge convective cooling system 202, 302, 402 connects the leading edge 204 of the respective airfoils 200, 300, 400 to the rib 244, which is cooler than the leading edge 204 and enables a transfer of heat through the respective pin structures 250, 350 and pin sets 450 to cool the leading edge 204. Further, the pin structures 250, 350 and pin sets 450 increase turbulence within the leading edge cavity 240 by creating strong secondary flow structures due to the pin structures 250, 350 and pin sets 450 traversing the leading edge cavity 240 and extending axially from the first end 246 to the second end 248. The increased turbulence created by the pin structures 250, 350 and pin sets 450 promotes a mixing of the cooling fluid F, which enables more thermal energy from the leading edge 204 of the respective airfoil 200, 300, 400 to transfer into the cooling fluid F. Moreover, the pin structures 250, 350 and pin sets 450 increase the heat transfer cooling area. By improving the cooling of the leading edge 204, the risk of oxidation of the airfoil 200, 300, 400 is reduced and higher turbine inlet temperature may be achieved. In addition, the pin structures 250, 350 and pin sets 450 enable a reduction in an amount of cooling flow required to maintain integrity of the airfoil 200. Generally, the pin structures 250, 350 and pin sets 450 enable a cooling flow to the leading edge 204 to be reduced by approximately half of a conventional cooling flow required for a leading edge that is smooth or devoid of the pin structures 250, 350 and/or pin sets 450.

It should be noted that in addition to the leading edge convective cooling system 202, 302, 402, one or more of the leading edge cavities 240 may include one or more turbulators in addition to the respective pin structures 250, 350 and pin sets 450. Moreover, although the airfoils 200, 300, 400 are shown and described herein as including a single one of the leading edge convective cooling systems 202, 302, 402, it will be understood that an airfoil may include any number and combination of pin structures 250, 350 and pin sets 450.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An airfoil, comprising:
   a leading edge and an opposing trailing edge;
   a pressure sidewall and an opposing suction sidewall, with a leading edge cavity defined between the pressure sidewall and the suction sidewall, the leading edge cavity having a first end opposite the leading edge and a second end defined at a rib; and
   at least one pin structure defined in the leading edge cavity between the first end and the second end, the at least one pin structure including a main body and a first branch, the main body coupled to the second end and extending toward the first end, the first branch extending from the main body toward the first end.

2. The airfoil of claim 1, wherein the at least one pin structure comprises a plurality of pin structures defined in the leading edge cavity, each pin structure of the plurality of pin structures spaced apart over a height of the airfoil.

3. The airfoil of claim 1, wherein the main body has a first body end defined at the second end and a second body end, the second body end extends toward the first end of the leading edge cavity, and the first branch extends from the main body at the second body end to the first end of the leading edge cavity.

4. The airfoil of claim 3, further comprising a second branch, and the second branch extends from the main body at the second body end to an inner surface of the suction sidewall within the leading edge cavity.

5. The airfoil of claim 4, further comprising a third branch, and the third branch extends from the main body at the second body end to an inner surface of the pressure sidewall within the leading edge cavity.

6. The airfoil of claim 5, wherein the main body extends along an axis, the first branch extends along a first axis, the second branch extends along a second axis and the third branch extends along a third axis, and each of the first axis, the second axis and the third axis are different and intersect the axis of the main body.

7. The airfoil of claim 6, wherein the first axis, the second axis and the third axis intersect the axis of the main body at a point.

8. The airfoil of claim 1, wherein the main body has a first body end defined at the second end and a second body end that extends to the first end of the leading edge cavity, and the first branch extends from the main body between the first body end and the second body end to an inner surface of the suction sidewall within the leading edge cavity.

9. The airfoil of claim 8, further comprising a second branch, and the second branch extends from the main body between the first body end and the second body end to an inner surface of the pressure sidewall within the leading edge cavity.

10. The airfoil of claim 9, wherein the main body extends along an axis, the first branch extends along a first axis and the second branch extends along a second axis, and each of the first axis and the second axis are different and intersect the axis of the main body.

11. The airfoil of claim 10, wherein the first axis intersects the axis of the main body at a first point, the second axis intersects the axis of the main body at a second point and the first point is spaced a distance apart from the second point.

12. The airfoil of claim 1, wherein the airfoil is a stator associated with a gas turbine engine.

13. The airfoil of claim 1, wherein the airfoil is a blade of a rotor blade structure associated with a gas turbine engine.

14. An airfoil, comprising:
   a leading edge and an opposing a trailing edge;
   a pressure sidewall and an opposing suction sidewall, with a leading edge cavity defined between the pressure sidewall and the suction sidewall, the leading edge cavity having a first end opposite the leading edge and a second end defined at a rib; and at least one pin set defined in the leading edge cavity between the first end and the second end, the at least one pin set including a first pin and a second pin, the first pin coupled to the second end and extending to an inner surface of the suction sidewall, the second pin coupled to the second end and extending toward the first end, the first pin having a first pin end defined at the second end of the leading edge cavity, a second pin end defined at the inner surface of the suction sidewall, and a curved portion defined between the first pin end and the second pin end that curves upward in a direction, the second pin having a third pin end defined at the second end of the leading edge cavity, a fourth pin end defined at the inner surface of the pressure sidewall, and a second curved portion defined between the third pin end and the fourth pin end that curves downward in the direction, the curved portion of the first pin overlapping the second curved portion of the second pin.

15. The airfoil of claim 14, wherein the at least one pin set comprises a plurality of pin sets defined in the leading edge cavity, each pin set of the plurality of pin sets spaced apart over a height of the airfoil.

16. An airfoil, comprising:

a leading edge and an opposing trailing edge;

a pressure sidewall and an opposing suction sidewall, with a leading edge cavity defined between the pressure sidewall and the suction sidewall, the leading edge cavity having a first end opposite the leading edge and a second end defined at a rib; and at least one pin structure defined in the leading edge cavity between the first end and the second end, the at least one pin structure including a main body, a first branch and a second branch, the main body having a first body end defined from the second end and extending toward the first end, the first branch extending from a second body end to the first end, the second branch extending from the second body end to an inner surface of the suction sidewall within the leading edge cavity.

17. The airfoil of claim 16, further comprising a third branch, and the third branch extends from the main body at the second body end to an inner surface of the pressure sidewall within the leading edge cavity.

18. The airfoil of claim 17, wherein the main body extends along an axis, the first branch extends along a first axis, the second branch extends along a second axis and the third branch extends along a third axis, and each of the first axis, the second axis and the third axis are different and intersect the axis of the main body at a point.

* * * * *